(12) United States Patent
Bovio et al.

(10) Patent No.: US 10,948,225 B2
(45) Date of Patent: Mar. 16, 2021

(54) COMPRESSOR UNIT, REFRIGERATION CIRCUIT COMPRISING THE SAME AND METHOD OF OPERATING A COMPRESSOR UNIT

(71) Applicant: Carrier Corporation, Palm Beach Gardens, FL (US)

(72) Inventors: Stefano Bovio, Villeurbanne (FR); Charbel Rahhal, Lyons (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 150 days.

(21) Appl. No.: 16/092,700

(22) PCT Filed: Apr. 15, 2016

(86) PCT No.: PCT/EP2016/058380
§ 371 (c)(1),
(2) Date: Oct. 10, 2018

(87) PCT Pub. No.: WO2017/178067
PCT Pub. Date: Oct. 19, 2017

(65) Prior Publication Data
US 2019/0145681 A1 May 16, 2019

(51) Int. Cl.
*F25B 49/02* (2006.01)
*F25B 1/04* (2006.01)
(Continued)

(52) U.S. Cl.
CPC .............. *F25B 49/025* (2013.01); *F25B 1/04* (2013.01); *H02P 1/426* (2013.01); *H02P 5/74* (2013.01);
(Continued)

(58) Field of Classification Search
CPC .. F25B 49/025; F25B 1/04; F25B 2600/0253; F25B 2600/024; F25B 2600/021;
(Continued)

(56) References Cited

U.S. PATENT DOCUMENTS

| | | | |
|---|---|---|---|
| 4,412,788 A | 11/1983 | Shaw et al. | |
| 4,459,535 A * | 7/1984 | Schutten | ................. H02P 25/04 |
| | | | 318/807 |

(Continued)

FOREIGN PATENT DOCUMENTS

| | | |
|---|---|---|
| CN | 201928220 U | 8/2011 |
| CN | 203933469 U | 11/2014 |

(Continued)

OTHER PUBLICATIONS

VFD, "Single VFD for Multiple Motors" Variable Frequency Drive, 2016, 2 pages.

(Continued)

*Primary Examiner* — Kun Kai Ma
(74) *Attorney, Agent, or Firm* — Cantor Colburn LLP (57) ABSTRACT

A compressor unit (2) for use in a refrigeration circuit, comprises at least two compressors (8, 10); and a common variable frequency drive (6), configured to be connected to a three phase grid voltage supply (4); each compressor (8, 10) having an inlet port (12) configured to be in refrigerant communication, via a suction line, with an outlet of an evaporator; an outlet port (14) configured to be in refrigerant communication, via a pressure line, to an inlet of a condenser; a compressor motor (18), particularly an alternating current induction motor, with a three phase supply line (32-1, 32-2); a power modulation means (24) for controlling the power of the compressor (8, 10) according to its load needs; wherein each compressor (8, 10) is switchable, independently from the respective other compressor(s) (8, (Continued)

10), to be connected, during start-up and acceleration of the respective compressor (8, 10), to the common variable frequency drive (6), and to be connected, during rated-speed operation of the respective compressor (8, 10), to a common three phase grid voltage supply (4).

16 Claims, 3 Drawing Sheets

(51) Int. Cl.
 *H02P 1/42* (2006.01)
 *H02P 5/74* (2006.01)
(52) U.S. Cl.
 CPC ... *F25B 2400/0751* (2013.01); *F25B 2500/26* (2013.01); *F25B 2600/021* (2013.01); *F25B 2600/024* (2013.01); *F25B 2600/0253* (2013.01); *Y02B 30/70* (2013.01)
(58) Field of Classification Search
 CPC .... F25B 2400/0751; H02P 1/426; H02P 5/74; Y02B 30/741
 See application file for complete search history.

(56) References Cited

U.S. PATENT DOCUMENTS

| | | | |
|---|---|---|---|
| 5,422,550 A | | 6/1995 | McClanahan et al. |
| 5,797,729 A | * | 8/1998 | Rafuse, Jr. .............. F04C 28/08 417/3 |
| 6,018,957 A | * | 2/2000 | Katra .................. F04B 41/06 62/175 |
| 6,813,897 B1 | * | 11/2004 | Bash ....................... G06F 1/206 62/175 |
| 7,028,491 B2 | | 4/2006 | Hortin |
| 7,202,626 B2 | | 4/2007 | Jadric et al. |
| 7,207,183 B2 | | 4/2007 | Crane et al. |
| 7,231,773 B2 | | 6/2007 | Crane et al. |
| 7,332,885 B2 | | 2/2008 | Schnetzka et al. |
| 7,425,806 B2 | * | 9/2008 | Schnetzka ........... H02M 5/4585 318/41 |
| 7,508,160 B1 | | 3/2009 | Rudniski |
| 7,526,926 B2 | | 5/2009 | Rasmussen et al. |
| 7,635,959 B2 | * | 12/2009 | Holden .................. F04B 49/06 318/254.1 |
| 7,836,713 B2 | | 11/2010 | Lifson et al. |
| 7,892,304 B2 | | 2/2011 | Hajiaghajani |
| 7,957,166 B2 | * | 6/2011 | Schnetzka ............. H02M 7/003 363/56.03 |
| 8,096,139 B2 | | 1/2012 | Taras et al. |
| 8,134,323 B2 | | 3/2012 | Leung et al. |
| 8,179,701 B2 | | 5/2012 | Swamy et al. |
| 8,209,057 B2 | | 6/2012 | Judge et al. |
| 8,299,646 B2 | | 10/2012 | Rockenfeller et al. |
| 8,305,783 B2 | | 11/2012 | Rizzo |
| 8,779,698 B2 | | 7/2014 | Havard et al. |
| 8,810,163 B2 | | 8/2014 | Skinner et al. |
| 9,024,559 B2 | | 5/2015 | Adiga-Manoor et al. |
| 9,657,973 B2 | * | 5/2017 | Bittner .................. F25B 27/005 |
| 2005/0188708 A1 | * | 9/2005 | Wills .................. F04C 29/0085 62/175 |
| 2005/0225270 A1 | * | 10/2005 | Schnetzka ........... H02M 5/4585 318/66 |
| 2008/0041081 A1 | * | 2/2008 | Tolbert .................. F25B 49/025 62/228.4 |
| 2009/0208311 A1 | | 8/2009 | Haley et al. |
| 2010/0263391 A1 | * | 10/2010 | Tetu ........................ F25B 1/053 62/89 |
| 2010/0329894 A1 | * | 12/2010 | Tolbert, Jr. ............. F04B 49/035 417/53 |
| 2011/0018473 A1 | * | 1/2011 | Rockenfeller ............ H02P 1/44 318/51 |
| 2011/0018474 A1 | * | 1/2011 | Harhay ..................... H02P 1/30 318/82 |
| 2012/0017634 A1 | * | 1/2012 | Dorman .................. F04C 28/08 62/498 |
| 2013/0334998 A1 | | 12/2013 | Osman |
| 2014/0069120 A1 | | 3/2014 | Takemoto et al. |
| 2015/0292762 A1 | * | 10/2015 | Clanin .................... F25B 49/02 700/276 |
| 2016/0006379 A1 | * | 1/2016 | Wang ....................... H02P 5/74 318/5 |

FOREIGN PATENT DOCUMENTS

| | | |
|---|---|---|
| WO | 2004011862 A1 | 2/2004 |
| WO | 2013020034 A2 | 2/2013 |
| WO | 2013036656 A1 | 3/2013 |
| WO | 2013121442 A2 | 8/2013 |

OTHER PUBLICATIONS

Weichert, Hans, et al., "Interaction of electro mechanical switchgear and Variable Frequency Drives", abstract, ResearchGate, Dec. 2012, 2 pages.
De Almeida, Anibal T., et al., "Technical and Economical Considerations in the Application of Variable-Speed Drives With Electric Motor Systems", IEEE Transactions on Industry Applications, vol. 41, No. 1, Jan./Feb. 2005, 12 pages.
International Search Report and Written Opinion for application PCT/EP2016/05880, dated Jan. 19, 2017, 11 pages.

* cited by examiner

COMPRESSOR UNIT, REFRIGERATION CIRCUIT COMPRISING THE SAME AND METHOD OF OPERATING A COMPRESSOR UNIT

The present invention relates to a compressor unit for use in a refrigeration circuit, a refrigeration circuit comprising a compressor unit and a method of operating a compressor unit.

Conventional refrigeration systems use compressors for compressing a refrigerant circulating therein. Sometimes large Alternating Current motors are used to drive such compressors. When starting up such large AC motors, the transient inrush current can get very high which is undesirable. Therefore, often costly transformers have to be provided at the grid voltage side Accordingly, it is desirable to provide a compressor unit for use in a refrigeration circuit in which high inrush currents during start-up are reliably avoided, while making the compressor unit inexpensive and highly effective when running at full speed.

A compressor unit for use in a refrigeration circuit, according to exemplary embodiments of the invention, comprises at least two compressors; and a common variable frequency drive, configured to be connected to a three phase grid voltage supply; each compressor having an inlet port configured to be in refrigerant communication, via a suction line, with an outlet of an evaporator; an outlet port configured to be in refrigerant communication, via a pressure line, to an inlet of a condenser; a compressor motor, particularly an alternating current induction motor, with a three phase supply line; a power modulation means for controlling the power of the compressor according to its load needs; wherein each compressor is switchable, independently from the respective other compressor(s), to be connected, during start-up and acceleration of the respective compressor, to the common variable frequency drive, and to be connected, during rated-speed operation of the respective compressor, to a common three phase grid voltage supply With such a compressor unit, too high inrush currents are reliably avoided. Costly transformers that are often provided at the grid voltage side in conventional systems in order to avoid high inrush currents can be omitted.

The compressor unit according to exemplary embodiments of the invention is also less expensive compared to systems in which a variable frequency drive unit is employed which permanently supplies power to the compressor(s). Compared to such a system, the compressor unit according to exemplary embodiments of the present invention has a better efficiency at higher speeds, particularly at the rated speed of the compressor motor.

The term "rated speed" is understood as the speed at which a fixed speed compressor is running in normal operation, for example 50 Hz or 60 Hz, depending on the supply. At this rated speed, the power modulation means, particularly the slide valve in case of a screw compressor or a guide vane in case of a centrifugal compressor, is used to control the compressor power during normal operation.

The speed of the compressor is often given in rpm (revolutions per minute), and it represent the rotational speed of the rotor. The frequency, given in Hertz, represents the frequency of the AC voltage. The relationship between frequency and speed of a compressor motor is speed= (frequency×60×2)/(pole pairs of motor).

The compressors of the compressor unit according to exemplary embodiments of the invention can be fixed speed compressors that are not used with a variation of speed to manage or control its power, but where a power modulation means is provided for controlling the power of the compressor according to its load needs.

The rated voltage, the rated speed and sometimes other parameters of a compressor motor are often indicated on its nameplate. A compressor motor that is running at rated speed is supplied at its rated voltage and at its rated frequency. The nameplate condition (voltage, frequency, mechanical speed, load, cos phi, etc.) in which a compressor motor is operating is often referred to a rated condition.

Also the fact that two or more compressors share one common variable frequency drive contributes to lower cost of the compressor unit.

Since the motor of a compressor unit, according to exemplary embodiments of the invention, is not driven via the common VFD during rated speed operation, but rather by a direct connection to the common three phase grid voltage supply, the VFD can be sized for lower power requirements, which also contributes to keeping the cost for the entire compressor unit low.

With compressor units according to exemplary embodiments of the invention as described herein the common variable frequency drive is used only for the start-up and/or acceleration phase which can also be called ramp-up phase. Once the compressor has reached its rated speed, it is switched over to be connected to the common three phase grid voltage supply, and the variable frequency drive is switched off. In this way, the maximum efficiency can be obtained, since the variable frequency drive is not connected to the compressors at rated speed operation of the same.

Since the common VFD is only used during start-up and/or acceleration of the respective compressor and is not used to operate the compressor motor under load in its operational mode, the efficiency of the compressor unit is higher compared to compressors which are operated via the VFD also in their operational mode, and particularly at their rated speed. The efficiency improvement is expected to be in the range of 3 to 4%.

Also, by using three lines supplying three phase current to connect the compressor motor(s) both to the common three phase grid voltage supply and to the common variable frequency drive, instead of six lines as it is sometimes the case, also the costs for the current supply lines can be reduced.

According to exemplary embodiments of the invention, as described herein, although one common variable frequency drive is used for start-up and/or acceleration of all the compressors, each of the compressors can be connected, started-up, accelerated, and operated individually and independently from the other compressors, to match the load needs, particularly changing load needs, at the evaporator side of the refrigeration circuit.

Furthermore, no current harmonics occur at full load. Rather, such current harmonics only occur as transients in the start-up and acceleration phases. Moreover, there is no permanent total harmonic distortion.

According to the first embodiment, the three phase power supply line of each compressor comprises a three phase variable frequency supply connected to the common variable frequency drive, and a three phase supply line to compressor configured to be connected to the common three phase grid voltage supply; the three phase supply line to compressor having a first switch; and the three phase variable frequency supply having a second switch. With this embodiment, the functionality of each compressor being individually connectable to the common variable frequency drive, during start-up and acceleration of the respective compressor, or to the common three phase common supply, during rated speed operation, can be implemented in a simple and cost-effective manner. The switching over from the three phase variable frequency supply to the three phase grid voltage supply can be effected easily and reliably by opening the second switch and closing the first switch.

According to a further embodiment, each of the compressors is one of a screw compressor and a centrifugal compressor. According to a further embodiment, each of the compressors is configured to run at its rated speed.

In case of a screw compressor, the power modulation means can be formed as a slide valve. In case of a centrifugal compressor the power modulation means can be formed as a guide vane.

Such power modulation means perform the power management of the compressor. Typically, the power modulation means is kept at its minimum power/minimum load position during the start-up and acceleration phase to minimize the power. Once the respective compressor is energized at its rated speed, the power modulation means is modulated and particularly moved to a higher power/load position or to its maximum power/load position, in order to meet the load needs at the evaporator side.

According to a further embodiment, the common variable frequency drive has a maximum power which corresponds to less than 100%, particularly to about 15 to 60%, particularly 30 to 60% of the power of at least one of the compressors running at nominal voltage, at rated speed, at full load, and with the power modulation means being at its maximum power position. As will be explained in more detail below, the common variable frequency drive can be undersized versus the nominal power consumption of the compressor motor(s) by 15 to 60%, particularly 30 to 60%, thereby making it possible to use a cheaper and smaller variable frequency drive.

According to a further embodiment, the compressor unit further a control unit in signal communication with the common variable frequency drive via a control line, with the second switch of the three phase variable frequency supply of each compressor via respective control lines, with the first switch of the three phase supply line of each compressor via respective control lines, and with the power modulation means of each compressor via respective control lines;

wherein the control unit is configured to perform the following steps:
(a) connecting the compressor to the common variable frequency drive by closing the second switch in the three phase supply line;
(b) driving the common variable frequency drive such that the speed of the compressor is increased in a start-up phase and/or in an acceleration phase to a switch over frequency value which corresponds to the rated speed of the compressor or to a speed slightly higher than the rated speed of the compressor;
(c) stopping the common variable frequency drive and disconnecting the compressor from the common variable frequency drive by opening the second switch in the three phase variable frequency supply line;
(d) connecting the compressor to the three phase grid voltage supply by closing the first switch in the three phase supply line and operating the compressor with its rated speed; and
(e) increasing the compressor power though operating the power modulation means, in order to meet the load needs.

Further exemplary embodiments of the invention relate to a method of operating a compressor unit, as described herein, in a refrigeration circuit, particularly to a method of starting up and accelerating the compressors of a compressor unit, as described herein, in a refrigeration circuit, and of increasing their power to meet the load needs, The method comprises the steps of:
(a) connecting the compressor to the common variable frequency drive by closing the second switch in the three phase supply line;
(b) driving the common variable frequency drive such that the speed of the compressor is increased in a start-up phase and/or in an acceleration phase to a switch over frequency value which corresponds to the rated speed of the compressor or to a speed slightly higher than the rated speed of the compressor;
(c) stopping the common variable frequency drive and disconnecting the compressor from the common variable frequency drive by opening the second switch in the three phase variable frequency supply line;
(d) connecting the compressor to the three phase grid voltage supply by closing the first switch in the three phase supply line and operating the compressor with its rated speed; and
(e) increasing the compressor power though operating the power modulation means, in order to meet the load needs Such operation/method reliably avoids a high inrush current, uses a common VFD only for the start-up and/or acceleration phase of the compressor motor and switches the compressor motor over to be connected to the three phase power supply line, once the compressor has been accelerated to run at its rated speed. The power management is made by the operation of the power modulation means, when the compressor is running at its rated speed and connected to the three phase supply line to compressor. This concept is inexpensive and reliable. The variable frequency drive can have a comparably small size. Only three lines are needed for the common variable frequency drive line and the grid voltage supply lines to the compressors. By driving the compressor motor(s) through the three phase supply line to compressor, when the compressors are under load, maximum efficiency can be ensured.

Although the attached set of claims does not include dependent method claims for the embodiments of the method of operating a compressor unit as described hereinafter, the applicant explicitly reserves the right to put up such method claims at a later stage of the procedure.

According to a further embodiment, for each compressor a respective VFD relay is arranged in the control line to the common variable frequency drive and the respective control line to the second switch of the three phase variable frequency supply, the VFD relay being configured to enable the current supply to the VFD when the respective second switch is closed and to disable the current supply to the VFD when the respective second switch is opened. In operation, the control unit causes the VFD relay to enable the current supply to the VFD, when the second switch is closed in or after step (a). The VFD relay contributes to a safe operation of the compressor unit, since it allows the common VFD to be enabled only when the second switch is energized and closed, and since the common VFD will automatically and reliably be disabled if the second switch is caused to open.

According to a further embodiment, for each compressor a respective delay relay is arranged in the respective control line to the first switch of the three phase supply line to compressor and in the respective control line to the second switch of the three phase variable frequency supply; wherein the delay relay is configured to keep the respective first switch open as long as the respective second switch is closed and to allow the respective first switch to be closed only with a predetermined delay after the respective second switch has been closed. In operation, the control unit causes the delay relay to introduce a delay between the opening of the second switch in step (c) and the closing of the first switch in step (d). The delay relay also contributes to a safe operation of the compressor unit, since it ensures that the first and second switches for the same compressor are not closed simultaneously. Furthermore, the delay relay introduces some delay between opening of the second switch and closing of the first switch for one and the same compressor, which allows for a convenient switching over from the common VFD driving the respective compressor to the three phase grid voltage supply driving the compressor. This helps keeping transient currents low.

According to a further embodiment, for each compressor a respective priority relay is arranged in the respective control line to the first switch of the three phase supply line to compressor and in the respective control line to the second switch of the three phase variable frequency supply; wherein the priority relay is configured to disable the VFD and to open the respective second switch of the three phase variable frequency supply, when the respective first switch is activated. In operation, the control unit activates the priority relay in step (c), such that the VFD relay disables the VFD, so that the second switch is opened, and that the delay relay causes a delay between the opening of the second switch in step (c) and the closing of the first switch in step (d). The priority relay contributes to a stable and reliable control of the compressor unit, since it associates the highest priority to the command transmitted over the control line to the first switch. The delays between the opening of the second switch and the closing of the first switch are therefore managed only via the delay setting. There is no further software function necessary.

According to a further embodiment, the compressor power can be increased directly after the connecting step (a) to an intermediate compressor power level, by increasing the power modulation means position between the start-up phase and the acceleration phase. This particular embodiment may be used to efficiently manage the dynamics after start-up. Typically, the power modulation means position is only increased slightly.

According to a further embodiment, the start-up phase is performed while the power modulation means is in its minimum position. This contributes to a smooth start-up of the respective compressor.

According to a further embodiment, the method steps (a) to (e) are repeated for the second compressor and each further compressor, if any, depending on the load needs at the evaporator side.

According to a further embodiment, a further step (f) is performed after step (d) or (e), namely stopping the compressor by disconnecting the three phase power supply line from the three phase supply line to compressor by opening the second switch. Such stopping is usually done while the power modulation means is at its minimum power position. This allows for an easy and quick shutdown of the respective compressor without having to employ the variable frequency drive during shutdown.

According to a further embodiment, the three phase grid voltage supply is part of a compressor unit, wherein the common variable frequency drive is connected to the three phase grid voltage supply.

Further exemplary embodiments of the invention, as described herein, relate to a refrigeration circuit, comprising, in the direction of flow of a circulating refrigerant, a compressor unit as described herein; a condenser; an expansion device; and an evaporator; wherein the inlet ports of the compressors of the compressor unit are in refrigerant communication, via a suction line, with an outlet of the evaporator; and wherein the outlet ports of the compressors of the compressor unit are in refrigerant communication, via a pressure line, to an inlet of the condenser.

Embodiments of the invention are described in greater detail below with reference to the figures, wherein.

Figure 1:
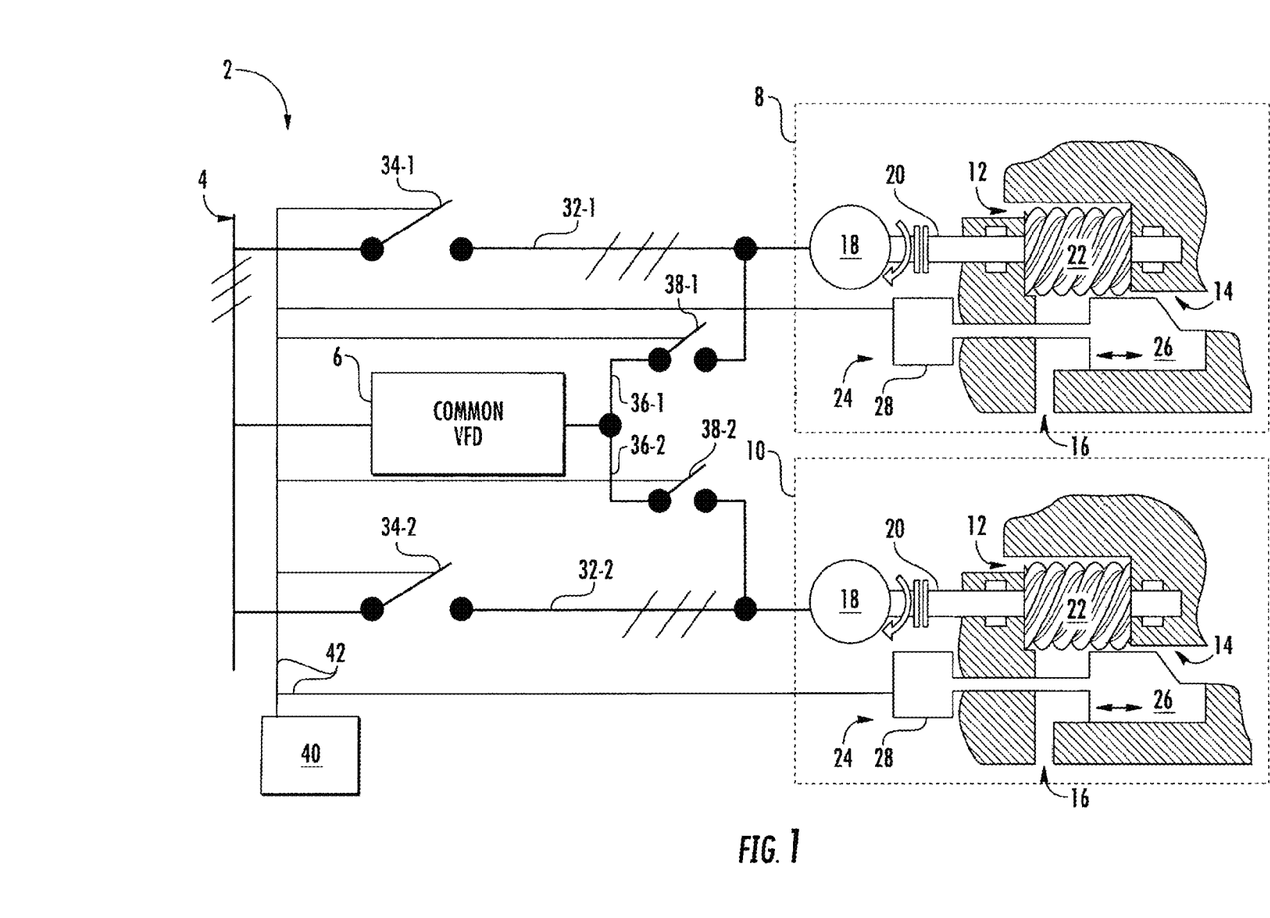
FIG. 1 shows a schematic view of a compressor unit comprising a three phase grid voltage supply, a common variable frequency drive, a first compressor and a second compressor.

FIG. 1 shows a schematic view of a compressor unit 2 comprising a three phase grid voltage supply 4, a common variable frequency drive 6, a first compressor 8 and a second compressor 10.

The first compressor 8 and the second compressor 10 are screw compressors of the same type, and same elements are designated with the same reference numerals, respectively.

The compressor unit 2 can be part of a vapor compression refrigeration circuit, which comprises, in the direction of flow of a circulating refrigerant, the first and the second compressors 8, 10, a condenser, an expansion device and an evaporator. The vapor compression refrigeration circuit can also comprise further elements like a collecting container, a freezing branch and so on.

The first and second compressors 8 and 10 have a compressor housing in which rotors 22 driven by a compressor motor 18, particularly an alternating current induction motor, via a shaft 20 are situated. The structure and operation of such screw compressor 8, 10 is only explained briefly, for purposes of better understanding of the claimed subject-matter.

Low pressure refrigerant that has been expanded in an evaporator flows through a suction line to an inlet port 12 of the respective compressor 8/10, is compressed therein by the rotors 22 to a higher pressure level and exits the respective compressor 8/10 through the outlet port 14, and through a pressure line attached thereto and flows to the condenser.

The compressors 8 and 10 further comprise a respective power modulation means, which is formed in the present non-limiting embodiment, in which the compressors 8 and 10 are screw compressors, as a slide valve 24 comprising a slide 26 movable in a left/right direction by means of an actuator 28, and a control port 16. Movement of the slide 26 to the left and to the right increases and decreases the actual suction volume and consequently increases and decreases the compressor power.

When the slide 26 is in its left position, not shown, the slide valve 24 is open and the respective compressor 8/10 delivers its maximum power, whereas, when the slide 26 is in its right position as depicted in FIG. 1, the slide valve is closed and the respective compressor 8/10 delivers its minimum power.

In the present, non-limiting embodiment, the compressors 8 and 10 are screw compressors having a rated voltage of 400V at 50 Hz and that are equipped with slide valves 24.

For a compressor motor to be run at fixed speed on network voltage grid, it is required that the voltage/frequency of the voltage grid source shall be coincident with the motor rated voltage/frequency nameplate. A motor 400V/50 Hz can be run at fixed speed on a grid, whereas for example a motor 400V/90 Hz cannot be run fixed speed on a grid, since such V/f is not existing in conventional power sources.

In another embodiment (not shown), the compressors 8 and 10 can be centrifugal compressors, and the power modulation means is formed as a respective guide vane.

In the present, non-limiting embodiment, the three phase grid voltage supply 4 supplies a grid voltage of 400V at 50 Hz or a grid voltage 450V at 60 Hz. The three phase grid voltage supply 4 is connected via three phase supply lines 32-1 and 32-2 to the compressor motors 18 of the first and second compressors 8 and 10.

The three phase supply lines 32 are equipped with respective first switches 34-1 and 34-2, that can be switched, by a control unit 40, between an opened, interrupted position and a closed conductive position.

The common variable frequency drive (common VFD) 6 is connected with its input side to the three phase grid voltage supply 4. This common VFD 6 may controllably increase the magnitude and frequency of voltage applied to the compressor motors 18 of the first and second compressors 8 and 10 both during start-up and acceleration. The voltage magnitude and frequency may start at very low values and may then increase to the rated voltage of the compressor motors 8 and 10 and to the frequency of the three phase grid voltage supply 4, as the compressor motors 18 reach the rated speed.

The common VFD 6, which is one unit and which is not formed by separate VFDs per compressor motor 18, can be connected to the compressor motors 18 of the first and second compressors 8 and 10 by three phase variable frequency supplies 36-1 and 36-2, each of which is equipped with a second switch 38-1 and 38-2, respectively.

Again, the second switches 38-1 and 38-2 can be switched, by the control unit 40, between an open, interrupted position (as shown in FIG. 1) and a closed, conductive position. The three phase variable frequency supply exits the common VFD 6 as one line and branches into two three phase variable frequency supplies 36-1 and 36-2, the first one leading to the compressor motor 18 of the first compressor 8, particularly joining the three phase supply line 32-1 at a position before the compressor motor 18 of the first compressor 8, and the second one leading to the compressor motor 18 of the second compressor 10, particularly joining with the three phase supply line 32-2 at a position before the compressor motor 18.

The control unit 40 is connected, via control lines 42, to the common VFD 6, to the first switches 34-1 and 34-2 of both three phase supply lines 32-1 and 32-2, to the second switches 38-1 and 38-2 of both three phase variable frequency supplies 36-1 and 36-2 and to the slide valves 24 of the first and second compressors 8 and 10.

Furthermore, the control unit 40 receives control signals indicating the desired operational mode of the first and second compressors 8 and 10, particularly depending on the load needs at the evaporator side.

The compressor unit 2 can comprise a third compressor, a fourth compressor and so on (not depicted). Each further compressor can be connected to the three phase grid voltage supply 4 and to the common VFD 6 via a dedicated three phase supply line having a first switch and via a dedicated three phase variable frequency supply having a second switch. The control lines 42 would have to be connected to said first and second switches and to the slide valve of such further compressor in the same manner as described with respect to the first and second compressors 8 and 10.

Figure 2:
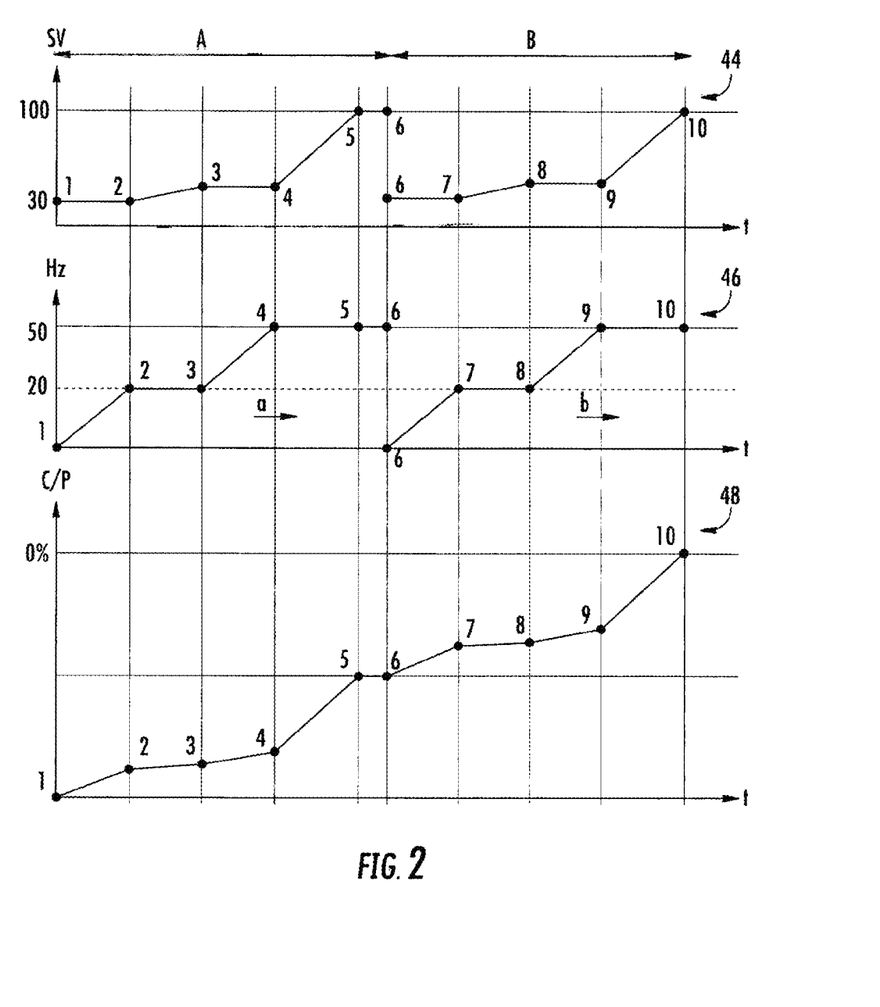
FIG. 2 shows a slide valve opening degree chart, an operational speed chart and an overall power chart, that are aligned vertically such that their X-axes correspond to each other.

FIG. 2 shows a slide valve opening degree chart 44, an operational speed chart 46 and an overall power chart 48, that are aligned vertically such that their X-axes correspond to each other.

The curves of the three charts 44, 46 and 48 comprise ten dedicated points in time 1 to 10 with lines extending between adjacent points in time. The first six points in time 1 to 6 belong to a first circuit A, in which the first compressor 8 is started, accelerated and brought to its rated speed and full load, and to a second circuit B, to which the points in time 6 to 10 belong, in which the second compressor 10 is started, accelerated and brought to its rated speed and full load.

Below, the method for starting the compressors 8 and 10 and bringing them to the rated speed and the required power will be explained in detail.

In the beginning, at point 1, the compressors 8 and 10 are switched off. At point 1, the control unit 40 connects the three phase grid voltage supply 36-1 of the first compressor 8 to the common variable frequency drive 6 by closing the second switch 38-1. The slide valve 24 is at its minimum position, which is in the present non-limiting embodiment at 30%.

Subsequently, between points 1 and 2, the control unit 40 causes the common VFD 6 to start-up the compressor 8 and increase its operational speed from 0 to 20 Hz, which increase can well be seen in the operational speed chart 46 and in the power chart 48. The start-up phase between 1 and 2 typically takes 1 to 2 seconds.

Between points 2 and 3, the operational speed of the compressor 8 is not further being increased by the common VFD 6, but rather kept constant. In this phase, the dynamics of the compressor 8 is managed by slightly increasing the slide valve 24 position. In the present, non-limiting embodiment the slide valve 24 position is increased from its 30 to its 40% position. This increase can well be seen in the slide valve opening degree chart 44 and in the power chart 48.

Between points 3 and 4, the control unit 40 causes the common VFD 6 to increase the operational speed of the compressor 8 to reach its rated speed of 50 Hz. In this phase, the position of the slide valve 24 remains unchanged. This can well be seen in the operational speed chart 46 and in the power chart 48. This phase can be called acceleration phase. In this acceleration phase, the slide valve position is unchanged, as can well be seen in the slide valve opening degree chart 44. In the acceleration phase the compressor's speed is ramped-up to 50 Hz with an acceleration typically being in the range of 0.5 to 2 Hz/s. By keeping the slide valve 24 closed, the power is minimal.

At point 4, the compressor 8 has reached its rated speed of 50 Hz. At this point in time, the control unit 40 turns off the common VFD 6, disconnects the compressor 8 from the common VFD 6 by opening the second switch 38-1 and closes the first switch 34-1 in the three phase supply line 32, such that the compressor 8 will now be powered directly by the three phase grid voltage supply 4. The compressor 8 continues to operate with its rated speed of 50 Hz. At 4, the switchover is done once the transient current to 50 Hz is over. When the common VFD 6, is stopped, it can be freewheeling.

Between points 4 and 5, the standard load management using the slide valve 24 is carried out. As can well be seen in the slide valve opening degree chart 44, between points in time 4 and 5 the slide valve is moved from its 40% position to its full 100% power position in order to meet the load needs at the evaporator side.

If the refrigeration circuit needs more cooling capacity at the evaporator side, which is the case in the present non limiting embodiment, the second compressor 10 is started using the same approach as has been applied for the first compressor 8. In the present, non limiting embodiment the load needs are such that both the first compressor 8 and the second compressor 10 are needed to deliver full power.

The time spans between points 5 and 6 form a hysteresis phase, to ensure that further load is demanded from the evaporator side and that the control unit 40 decides to continue with circuit B, namely to start-up, accelerate and operate the second compressor 10 in addition to the first compressor 8.

For the second compressor 10, in the circuit B, the same actions are performed between the points in time 6 to 10 as have been performed with respect to the first compressor 8 between points in time 1 and 5, namely start-up phase between 6 and 7, slide valve increase phase between 7 and 8, compressor acceleration phase between 8 and 9, and load management phase between 9 and 10.

The course of the charts 44 and 46 in circuit B between points in time 6 to 10 corresponds to the course of the chart in circuit A between points in time 1 and 5.

According to point 5 of the overall power chart 48, the power needed for operating the first compressor 8 at its rated speed and at its full load corresponds to 50% of the overall power, whereas at point 10 the power needed for operating the first and second compressors 8 and 10 at their rated speed and at their full load is 100% and equals the overall power.

If the compressor unit 2 is to be stopped, the compressors 8 and 10 can just be disconnected from the three phase grid voltage supply 4 by opening the first switch (es) 34-1 and 34-2, respectively. The shutting down of a compressor is usually done when the slide valve 24 is at its minimum load position.

The common VFD 6 can be sized such that it delivers its maximum power possible which is at a level which corresponds to point 4 only. This makes it possible to make the common VFD 6 much smaller as compared to a scenario where the VFD would have to deliver a maximum power corresponding to point 5.

As can easily be understood, each time there is a need to start a further compressor, the same phases of start-up, acceleration and operation, as described herein, are repeated.

Figure 3:
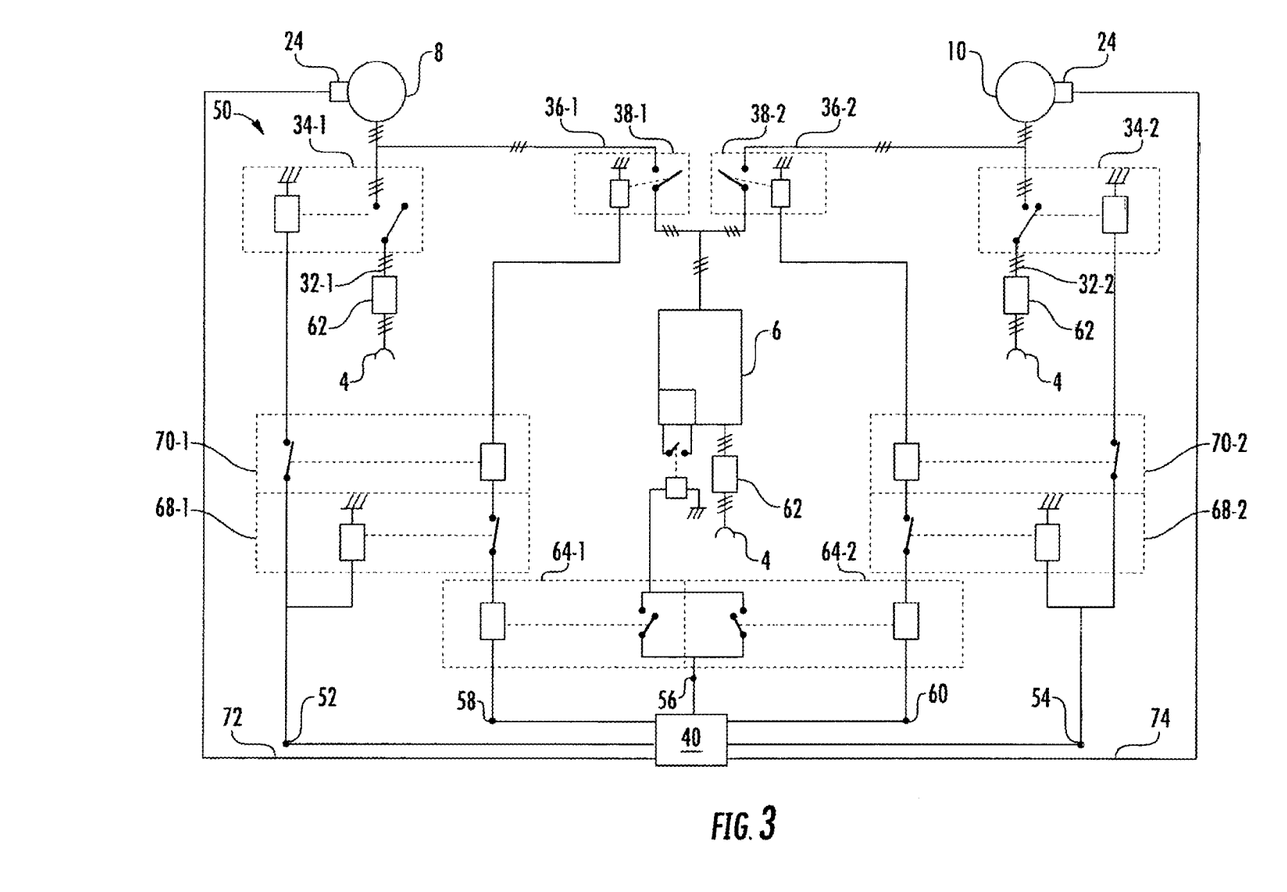
FIG. 3 shows a control schematic for controlling the compressor unit of FIG. 1.

FIG. 3 shows a control schematic 50 comprising the three phase grid voltage supply 4, the three phase supply lines 32-1 and 32-2 connecting the three phase grid voltage supply 4 to the first and second compressors 8 and 10, and the first switches 34-1 and 34-2 provided in these three phase supply lines 32-1 and 32-2, the variable frequency drive 6 connected with its input to the three phase grid voltage supply 4 and with its output to the three phase variable frequency supplies 36-1 and 36-2, in which respective second switches 38-1 and 38-2 are arranged, to the first and second compressors 8 and 10, and the control unit 40.

These elements are identical to the respective elements of the compressor unit 2 shown in FIG. 1, whereas the compressors 8 and 10 are depicted in a simplified manner. For brevity, the description of these elements is not repeated here.

The lines from the three-phase current supply 4 to the first switches 34-1 and 34-2 and to the common VFD 6 are provided with respective fuses 62.

For purposes of better understanding of the function of the control unit 40, the control lines and their elements are shown in greater detail.

The first control line 52 is the control line C1 for operating the first switch 34-1 in the three phase supply line 32-1 leading to the first compressor 8.

The second control line 54 is the control line C2 for operating the first switch 34-2 in the three phase supply line 32-2 leading to the second compressor 10.

The third control line 56 is the control line VFD enable for enabling the VFD 6

The fourth control line 58 is the control line VFD1 for operating the second switch 38-1 in the three phase variable frequency supply 36-1 leading from the VFD 6 to the first compressor 8.

The fifth control line 60 is the control line VFD2 for operating the second switch 38-2 in the three phase variable frequency supply 36-2 leading from the VFD 6 to the second compressor 10.

The sixth control line 72 is the control line for controlling the slide valve 24 of the first compressor 8.

The seventh control line 74 is the control line for controlling the slide valve 24 of the second compressor 10.

Two respective VFD enable relays 64-1 and 64-2 are arranged in the control lines 56 and 58 and in the control lines 56 and 60.

Two respective priority relays 68-1 and 68-2 and two respective delay relays 70-1 and 70-2 are provided between the control lines 52 and 58 and between the control lines 54 and 60.

Now the method for operating the compressor unit 2, particularly the method of starting up and accelerating the compressors 8 and 10 of the compressor unit 2 from an idle stage to an operational state and of increasing their power to meet the load needs, is explained.

In the beginning, the slide valves 24 of the first and second compressors 8 and 10 are unloaded which means that the respective compressor is in its minimum power position. The priority relays 68-1 and 68-2 are in their default closed state, the delay relays 70-1 and 70-2 are in their default closed state, and the first switches 34-1 and 34-2 as well as the second switches 38-1 and 38-2 are in their default open state.

The control unit 40 transmits a VFD 1 signal on the control line 58 which causes the VFD enable relay 64-1 to close, which causes the delay relay 70-1 to open, and which causes the second switch 38-1 in the three phase variable frequency supply 36-1 to the first compressor 8 to close.

Then the control unit 40 generates a VFD enable high signal on the control line 56 which is transmitted over the VFD enable relay 64-1 to the common variable frequency drive 6 and which causes the common VFD 6 to start.

The compressor 8 is started up accordingly, and this start-up phase corresponds to the phase between points in time 1 and 2 in FIG. 2. The starting speed of the common VFD 6 will be set into the common VFD 6 and is less than the rated speed. According to points in time 2 and 3 of FIG. 2 the starting speed is 20 Hz.

Subsequently, the common VFD 6 output frequency is brought up to a switch over frequency value, and this corresponds to the acceleration phase between points in time 3 and 4 in FIG. 2, where the switch over frequency value is 50 Hz but can also be slightly higher, as will be explained below.

The acceleration of the common VFD 6 output frequency to the switch over frequency value can be done either via communication or via preset settings, especially cruise frequency and acceleration ramp inside the common VFD 6.

After the common VFD 6 output frequency has been brought up to the switch over frequency value which corresponds to point in time 4 of FIG. 2, the control unit 40 generates a C1 signal high on the control line 52, which signal activates the priority relay 68-1, such that the switch of the priority relay 68-1 in the control line 58 is opened, which causes the VFD enable relay 64-1 to open as well, which disables the common VFD 6, which de-energizes the delay relay 70-1 and thus closes the switch of the delay relay 70-1 in the control line 52, and which de-energizes the second switch 38-1 in the three phase variable frequency supply 36 to the first compressor 8 such that this second switch 38 is opened and the compressor 8 will be disconnected from the output of the common VFD 6.

The generation of the C1 signal high on the control line 52 further causes the first switch 34-1 in the three phase grid voltage supply 32-1 to the first compressor 8 to be energized and thus closed, such that the first compressor 8 is now connected with the three phase grid voltage supply 4 via the three phase grid voltage supply 32-1.

It is to be noted that in order to avoid a high transient current, the first switch 34-1 is only closed after the second switch 38-1 has been opened.

The control unit 40 can further generate a VFD 1 low signal on the control line 58 and a VFD enable low signal on the control line 58, since the common VFD 6 is no more needed to start up or accelerate the compressor 8. The compressor 8 is now operating at its rated speed and is connected to the three phase grid voltage supply 4 via the three phase grid voltage supply 32-1.

The point in time at which the control unit 40 generates the C1 high signal on the control line 52, optionally the VFD 1 low signal on the control line 58 and optionally the VFD enable low signal on control line 56 corresponds to the point in time 4 of FIG. 2.

Now, the control unit 40 generates a slide valve control signal on the control line 72 leading to the first slide valve 24, which causes the slide valve 24 to change to its power position corresponding to the actual load needs of the refrigeration circuit, for example to its fully loaded, maximum power position.

This phase corresponds to the load increase phase between points in time 4 and 5 in FIG. 2.

It has to be noted that the slide valve 24 can be modulated according to the load demand of the refrigeration circuit and can take any power position between the minimum and maximum power positions.

After the compressor 8 has been started up, accelerated and brought up to full load as has been explained before, the same steps can be repeated for the second compressor 10 using the respective elements: VFD enable relay 64-2, priority relay 68-2, delay relay 70-2, first and second switches 34-2 and 38-2, control lines 54, 56, 60, 74, three phase grid voltage supply 32-2 to the second compressor 10, and three phase variable frequency supply 36-2 to the second compressor 10. An explanation of these steps will be omitted for reasons of brevity.

In order to stop compressor 8 and/or compressor 10 the control unit 40 changes the C1 signal on control line 52 and/or the C2 signal on control line 54 from high to low. Both compressors 8 and 10 can be stopped simultaneously.

If the compressor 8 or the compressor 10 is still in the start-up or acceleration phase, it can be stopped by the control unit 40 putting the VFD 1 signal on control line 58/the VFD 2 signal on control line 60 and the VFD enable signal on control line 56 from high to low.

The time interval between the second switch 38-1/38-2 in the three phase variable frequency supply 36-1/36-2 is opened and the first switch 34-1/34-2 in the three phase grid voltage supply 32-1/32-2 is closed, constitutes a compressor voltage dead time in which the compressor motor is decelerating and defluxing.

The motor of the compressor 8 is accelerated using the common VFD 6, as has been explained before, to a speed of 2900 revolutions per minute. During such compressor voltage dead time the compressor motor decelerates by 200 rpm to 2700 rpm. After the first switch 34-1 has been closed and the first compressor 8 is connected to the three phase grid voltage supply 4, there will be a transient current, in order to recover the deceleration of 200 rpm and in order to accelerate the motor of the compressor 8 again to a speed of 2900 rpm. Such transient current is comparably small.

This situation is not depicted in FIG. 2. In order to show this phenomenon, there would be a decrease in the operational speed chart 46 in point 4 in FIG. 2

According to an alternative embodiment, such deceleration of the motor of the compressor 8/10 in between the opening of the second switch 38-1/38-2 and the closing of the first switch 34-1/34-2 is taken into consideration as follows:

The switch over frequency value to which the motor of the first compressor 8, and likewise the motor of the second compressor 10 are accelerated by the common VFD 6 can be slightly increased to a value corresponding to the rated speed of the compressor motor plus the expected deceleration. The switch over frequency value can be 1 to 10% higher than the rated speed of the compressor.

In a concrete example, the switch over frequency value can be increased over the rated speed of 50 Hz by 2 to 5 Hz up to 52 to 55 Hz approx., such that the speed of the compressor motor 8 before the dead time is pushed up to approximately 3000 to 3200 rpm approximately. In the compressor voltage dead time between opening the second switch 38-1/38-2 and closing the first switch 34-1/34-2, the compressor will decelerate from 3000 to 3200 rpm down to 2800 to 3000 rpm and thus the acceleration need after that to bring the compressor to its rated speed again is very small, or there is even no acceleration needed at all. Thus, there will only be a very small transient current to accelerate the motor or even no transient current at all.

According to a further aspect, the common VFD 6 has a maximum power which corresponds to less than 100%, particularly to 15 to 60%, particularly 30 to 60% of the power needed by the first compressor 8 or the second compressor 10 running at nominal voltage, at rated speed, and at full load with the slide valve 24 being in its maximum power position. This can also be called that the common VFD 6 is undersized versus the motor rating.

At the point in time when the second switch 38-1/38-2 is opened and the common VFD 6 is disconnected from the first compressor 8 or the second compressor 10, the slide valve 24 is in its minimum power position and the power consumption of the motor of the first compressor 8/second compressor 10 is much less than the nominal consumption of the motor.

According to the nominal power consumption of the compressor motor, the compressor motor is powered at nominal voltage and rated speed, for example 400 Volt/50 Hz or 460 Volt/50 Hz, and the power modulation means, for example the slide valve, is fully loaded such the compressor delivers its maximum power to satisfy the maximum load condition.

Compared to such nominal power consumption of the compressor 8/10, the common VFD 6 only has to supply a power which corresponds to the power consumption of the compressor motor with the power modulation means, for example the slide valve, being in its fully unloaded, minimum power position. Therefore, the maximum power that has to be supplied by the common VFD 6 typically corresponds to 15 to 60%, particularly to about 30 to 60% of the nominal power consumption of the compressor motor.

Such undersized common VFD 6 is cheaper and smaller than a VFD which has to supply the full nominal power to the compressor motor with the power modulation means being in its maximum power position.

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention is not limited to the particular embodiment disclosed, but that the invention will include all embodiments falling within the scope of the appended claims.

LIST OF REFERENCE NUMERALS

2 compressor unit
4 three phase grid voltage supply
6 common variable frequency drive
8 first compressor
10 second compressor
12 inlet port
14 outlet port
16 control port
18 compressor motor
20 shaft
22 rotors
24 slide valve
26 slide
28 step motor
32-1, 32-2 three phase supply lines to compressor
34-1, 34-2 first switches
36-1, 36-2 three phase variable frequency supply
38-1, 38-2 second switches
40 control unit
42 control lines
44 slide valve opening degree chart
46 operational speed chart
48 overall compressor power chart
50 control schematic
52 control line C1
54 control line C2
56 control line VFD enable
58 control line VFD 1
60 control line VFD 2
62 fuses
64-1, 64-2 VFD enable relays
68-1, 68-2 priority relays
70-1, 70-2 delay relays
72 control line first slide valve
74 control line second slide valve

The invention claimed is:

1. Compressor unit for use in a refrigeration circuit, comprising
    at least two compressors; and
    a common variable frequency drive, configured to be connected to a three phase grid voltage supply;
    each compressor having
        an inlet port configured to be in refrigerant communication, via a suction line, with an outlet of an evaporator;
        an outlet port configured to be in refrigerant communication, via a pressure line, to an inlet of a condenser;
        a compressor motor, particularly an alternating current induction motor, with a three phase supply line;
        a power modulation means for controlling the power of the compressor according to its load needs;
    wherein each compressor is switchable, independently from the respective other compressor, to be connected, during start-up and acceleration of the respective compressor to the common variable frequency drive, and to be directly connected, during rated-speed operation of the respective compressor, to a common three phase grid voltage supply;
    wherein the power modulation means is configured to be kept at its minimum power position during start-up and acceleration of the respective compressor to minimize the power; and
    wherein the power modulation means is configured to be modulated and moved to a higher power position or to its maximum power position, in order to meet the load needs at the evaporator side, during rated-speed operation of the respective compressor.

2. Compressor unit according to claim 1,
    wherein each compressor comprises a three phase variable frequency supply connected to the common variable frequency drive, and the three phase supply line configured to be connected to the common three phase grid voltage supply;
    the three phase supply line having a first switch; and
    the three phase variable frequency supply having a second switch.

3. Compressor unit according to claim 1,
    wherein each of the compressors is one of a screw compressor and a centrifugal compressor, and/or,
    wherein each of the compressors is configured to run at its rated speed.

4. Compressor unit according to claim 1,
    wherein the power modulation means has a minimum power position and a maximum power position; and/or wherein in case of a screw compressor the power modulation means is formed as a slide valve and in case of a centrifugal compressor the power modulation means is formed as a guide vane.

5. Compressor unit according to claim 1,
    wherein the common variable frequency drive has a maximum power which corresponds to less than 100%, particularly to 15 to 60%, particularly 30 to 60% of the power of at least one of the compressors running at nominal voltage, at rated speed, at full load, with the power modulation means being at its maximum power position.

6. Compressor unit according to claim 1,
    wherein the three phase grid voltage supply is part of the compressor unit;
    wherein the common variable frequency drive is connected to the three phase grid voltage supply.

7. Refrigeration circuit, comprising, in the direction of flow of a circulating refrigerant,
the compressor unit of claim 1;
a condenser;
an expansion device; and
an evaporator;
wherein the inlet ports of the compressors of the compressor unit are in refrigerant communication, via a suction line, with an outlet of the evaporator; and
wherein the outlet ports of the compressors of the compressor unit are in refrigerant communication, via a pressure line, to an inlet of the condenser.

8. Method of operating the compressor unit according to claim 1 in a refrigeration circuit, the method comprising:
(a) connecting the compressor to the common variable frequency drive by closing the second switch in the three phase supply line;
(b) driving the common variable frequency drive such that the speed of the compressor is increased in a start-up phase and/or in an acceleration phase to a switch over frequency value which corresponds to the rated speed of the compressor or to a speed slightly higher than the rated speed of the compressor;
(c) stopping the common variable frequency drive and disconnecting the compressor from the common variable frequency drive by opening the second switch in the three phase variable frequency supply line;
(d) connecting the compressor to the three phase grid voltage supply by closing the first switch in the three phase supply line and operating the compressor with its rated speed; and
(e) increasing the compressor power through operating the power modulation means, in order to meet the load needs;
wherein the power modulation means is kept at its minimum power position during start-up and acceleration of the respective compressor to minimize the power; and
wherein the power modulation means is modulated and moved to a higher power position or to its maximum power position, in order to meet the load needs at the evaporator side, during rated-speed operation of the respective compressor.

9. Compressor unit for use in a refrigeration circuit, comprising
at least two compressors; and
a common variable frequency drive, configured to be connected to a three phase grid voltage supply;
each compressor having
an inlet port configured to be in refrigerant communication, via a suction line, with an outlet of an evaporator;
an outlet port configured to be in refrigerant communication, via a pressure line, to an inlet of a condenser;
a compressor motor, particularly an alternating current induction motor, with a three phase supply line;
a power modulation means for controlling the power of the compressor according to its load needs;
wherein each compressor is switchable, independently from the respective other compressor, to be connected, during start-up and acceleration of the respective compressor to the common variable frequency drive, and to be connected, during rated-speed operation of the respective compressor, to a common three phase grid voltage supply;
wherein the power modulation means is configured to be kept at its minimum power position during start-up and acceleration of the respective compressor to minimize the power; and
wherein the power modulation means is configured to be modulated and moved to a higher power position or to its maximum power position, in order to meet the load needs at the evaporator side, during rated-speed operation of the respective compressor;
further comprising a control unit in signal communication with the common variable frequency drive via a control line, with the second switch of the three phase variable frequency supply of each compressor via respective control lines, with the first switch of the three phase supply line of each compressor via respective control lines, and with the power modulation means of each compressor via respective control lines;
wherein the control unit is configured to perform the following:
(a) connecting the compressor to the common variable frequency drive by closing the second switch in the three phase supply line;
(b) driving the common variable frequency drive such that the speed of the compressor is increased in a start-up phase and/or in an acceleration phase to a switch over frequency value which corresponds to the rated speed of the compressor or to a speed slightly higher than the rated speed of the compressor;
(c) stopping the common variable frequency drive and disconnecting the compressor from the common variable frequency drive by opening the second switch in the three phase variable frequency supply line;
(d) connecting the compressor to the three phase grid voltage supply by closing the first switch in the three phase supply line and operating the compressor with its rated speed; and
(e) increasing the compressor power though operating the power modulation means, in order to meet the load needs.

10. Compressor unit according to claim 9,
wherein for each compressor a respective VFD relay is arranged in the control line to the common variable frequency drive and the respective control line to the second switch of the three phase variable frequency supply, the VFD relay being configured to enable the current supply to the VFD when the respective second switch is closed and to disable the current supply to the VFD when the respective second switch is opened; and/or wherein the control unit causes the VFD relay to enable the current supply to the VFD, when the second switch is closed in or after step (a).

11. Compressor unit according to claim 9,
wherein for each compressor a respective delay relay is arranged in the respective control line to the first switch of the three phase supply line to compressor and in the respective control line to the second switch of the three phase variable frequency supply; wherein the delay relay is configured to keep the respective first switch opened as long as the respective second switch is closed and to allow the respective first switch to be closed only with a predetermined delay after the respective second switch has been closed; and/or wherein the control unit causes the delay relay to introduce a delay between the opening of the second switch in step (c) and the closing of the first switch in step (d).

12. Compressor unit according to claim 9,
wherein for each compressor a respective priority relay is arranged in the respective control line to the first switch of the three phase supply line to compressor and in the respective control line to the second switch of the three phase variable frequency supply; wherein the priority relay is configured to disable the VFD and to open the respective second switch of the three phase variable frequency supply, when the respective first switch is activated; and/or wherein the control unit activates the priority relay in step (c), such that the VFD relay disables the VFD, that the second switch is opened, and that the delay relay introduces a delay between the opening of the second switch in step (c) and the closing of the first switch in step (d).

13. Compressor unit according to claim 9,
wherein the control unit is further configured to increase the compressor power by operating the power modulation means in step (b) between the start-up phase and the acceleration phase.

14. Compressor unit according to claim 9,
wherein the control unit is further configured to perform the start-up phase of step (b) while the power modulation means is in its minimum power position.

15. Compressor unit according to claim 9,
wherein the control unit is further configured to repeat the steps (a), (b), (c), (d), and (e) for the second compressor and each further compressor, if any.

16. Compressor unit according to claim 9,
wherein the control unit is further configured to perform a step (f), after step (d) or (e):
stopping the compressor by disconnecting it from the three phase grid voltage supply by opening the first switch.

* * * * *